United States Patent
Mierczynski

(10) Patent No.: US 6,420,679 B1
(45) Date of Patent: Jul. 16, 2002

(54) MATERIAL HOLDING FIXTURE FOR LASER ENGRAVING

(76) Inventor: Clifford Mierczynski, 8321 Carnegia Ave., Westminister, CA (US) 92683

( * ) Notice: Subject to any disclaimer, the term of this patent is extended or adjusted under 35 U.S.C. 154(b) by 0 days.

(21) Appl. No.: 09/767,296

(22) Filed: Jan. 22, 2001

(51) Int. Cl.$^7$ .......................... B23K 26/36; B25B 11/00; B23Q 3/00
(52) U.S. Cl. .................... 219/121.82; 219/158; 269/79; 269/99
(58) Field of Search ...................... 219/121.67, 121.68, 219/121.69, 121.72, 121.82, 158, 161; 269/79, 99

(56) References Cited

U.S. PATENT DOCUMENTS

| | | | | |
|---|---|---|---|---|
| 2,365,436 A | * | 12/1944 | Saucier .......................... | 269/79 |
| 4,532,736 A | * | 8/1985 | Shinneman, Jr. et al. ..... | 269/79 |
| 6,175,999 B1 | * | 1/2001 | Sloan et al. .................. | 279/79 |

* cited by examiner

*Primary Examiner*—Samuel M. Heinrich
(74) *Attorney, Agent, or Firm*—Dennis W. Beech

(57) ABSTRACT

The material holding fixture has a base, which is slidably engaged with a rotatable holding platform. There are a pair of levers attached at one end to a base end and at the opposite end to a holding platform pivot position intermediate the ends of the holding platform. There is a back guide attached to the holding platform that is located to retain a material object in a position to engrave a surface. When the holding platform at a hinge end is moved relative to the base the holding platform opposite end is raised and lowered. The location of the levers maintains the holding platform opposite end and the base end in adjustment with an imaginary plane perpendicular to the base. This mechanism allows positioning of a surface of an object to be engraved perpendicular to a laser cutting device in instances where the object surface opposite is other than parallel to the surface to be engraved.

5 Claims, 3 Drawing Sheets

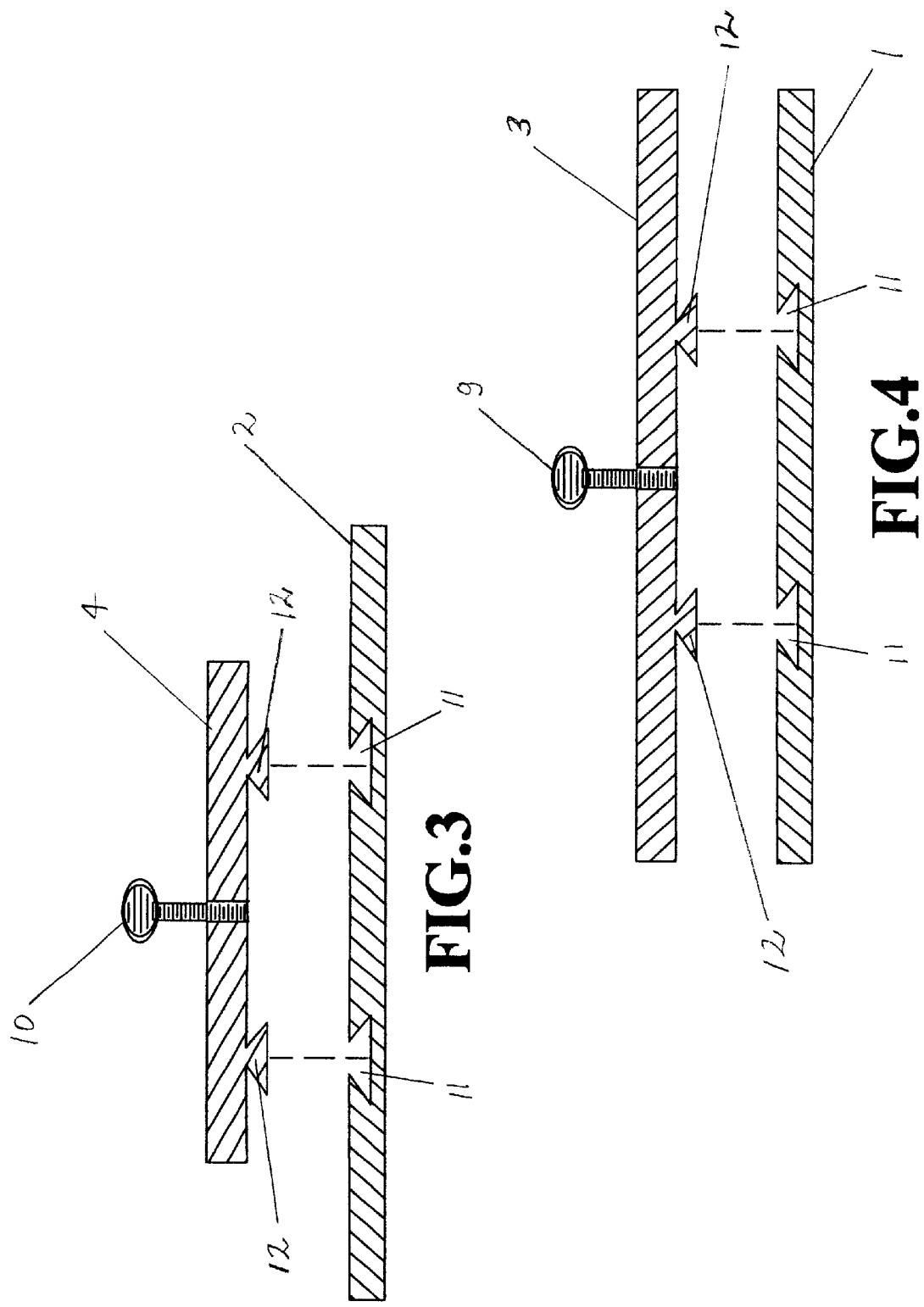

MATERIAL HOLDING FIXTURE FOR LASER ENGRAVING

BACKGROUND OF THE INVENTION

1. Field of the Invention

This invention relates to devices used to position and retain materials in alignment for performing an engraving or cutting operation. The new device positions the material such that a surface thereof is maintained at a uniform distance from the cutting device.

2. Description of Related Art

1. There are various devices and fixtures used to hold material while performing an operation on the material. Commonly understood fixtures include vise apparatus, which clamp the material to maintain its position. Flat stock material is normally placed on a flat mounting plate and retained in position by pins, clamps, or other fixturing.

2. The present invention in its preferred embodiment retains three dimensional objects, which have two opposite surfaces that are flat. The two surfaces may be parallel or have an angular relationship one to the other. In the case of an angular relationship the holding fixture is adjusted to maintain one surface at a uniform distance from an engraving or cutting device such as a laser. This allows engraving of the surface without the need to continually adjust the material.

SUMMARY OF THE INVENTION

One object of the present invention is the maintenance of alignment between a material to be cut or engraved and the cutting device. Another object is ease of adjustment of the material position relative to the cutting device to accommodate varying surface angular relationships.

In accordance with the description presented herein, other objectives of this invention will become apparent when the description and drawings are reviewed.

BRIEF DESCRIPTION OF THE DRAWING

FIG. 3 illustrates an end cross-sectional view of the holding platform and back guide.

FIG. 4 illustrates an end cross-sectional view of the base and angle adjustment bar.

DESCRIPTION OF THE PREFERRED EMBODIMENT

Figure 1:
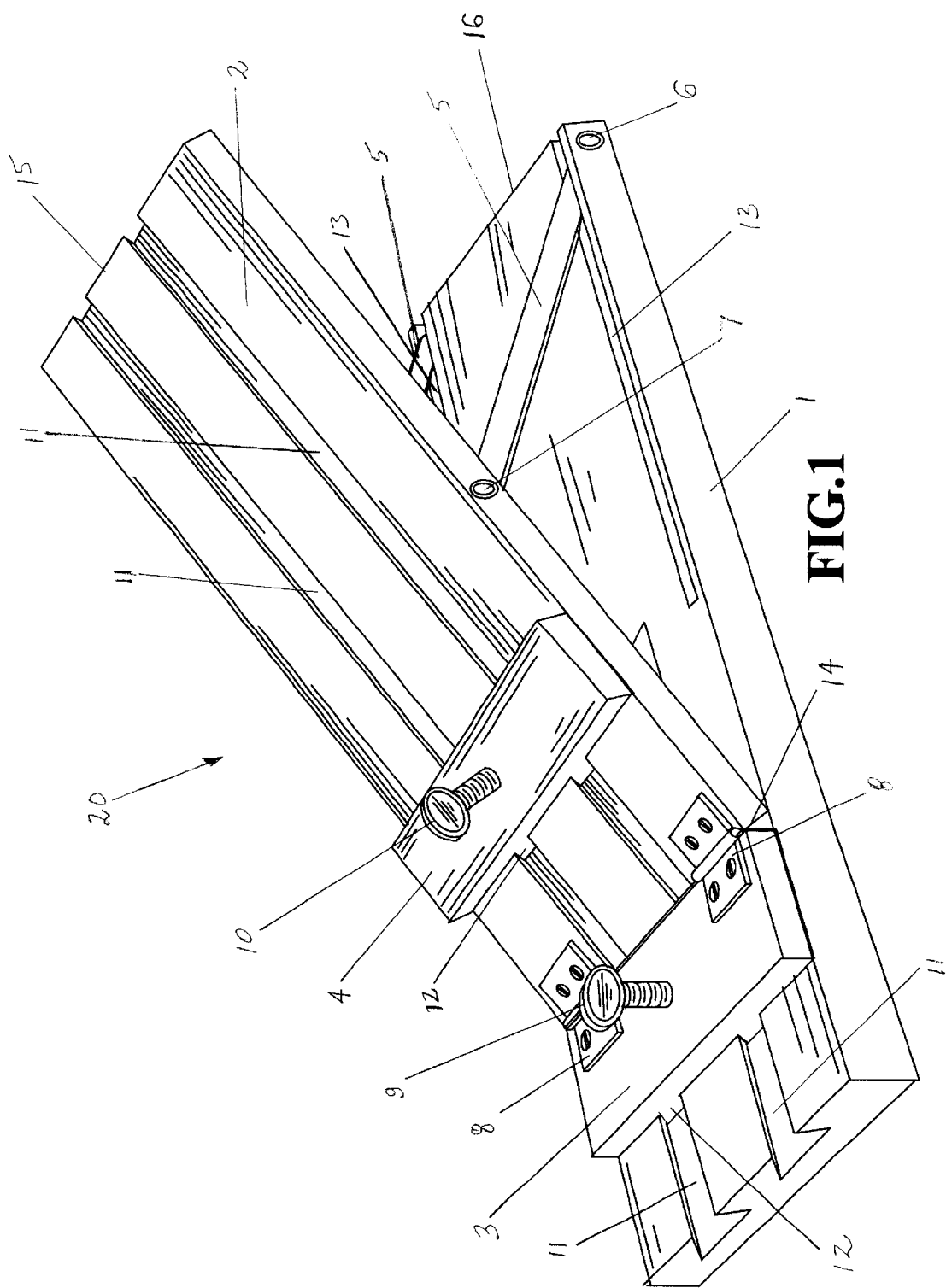
FIG. 1 illustrates a perspective view of the holding fixture.
Figure 2:
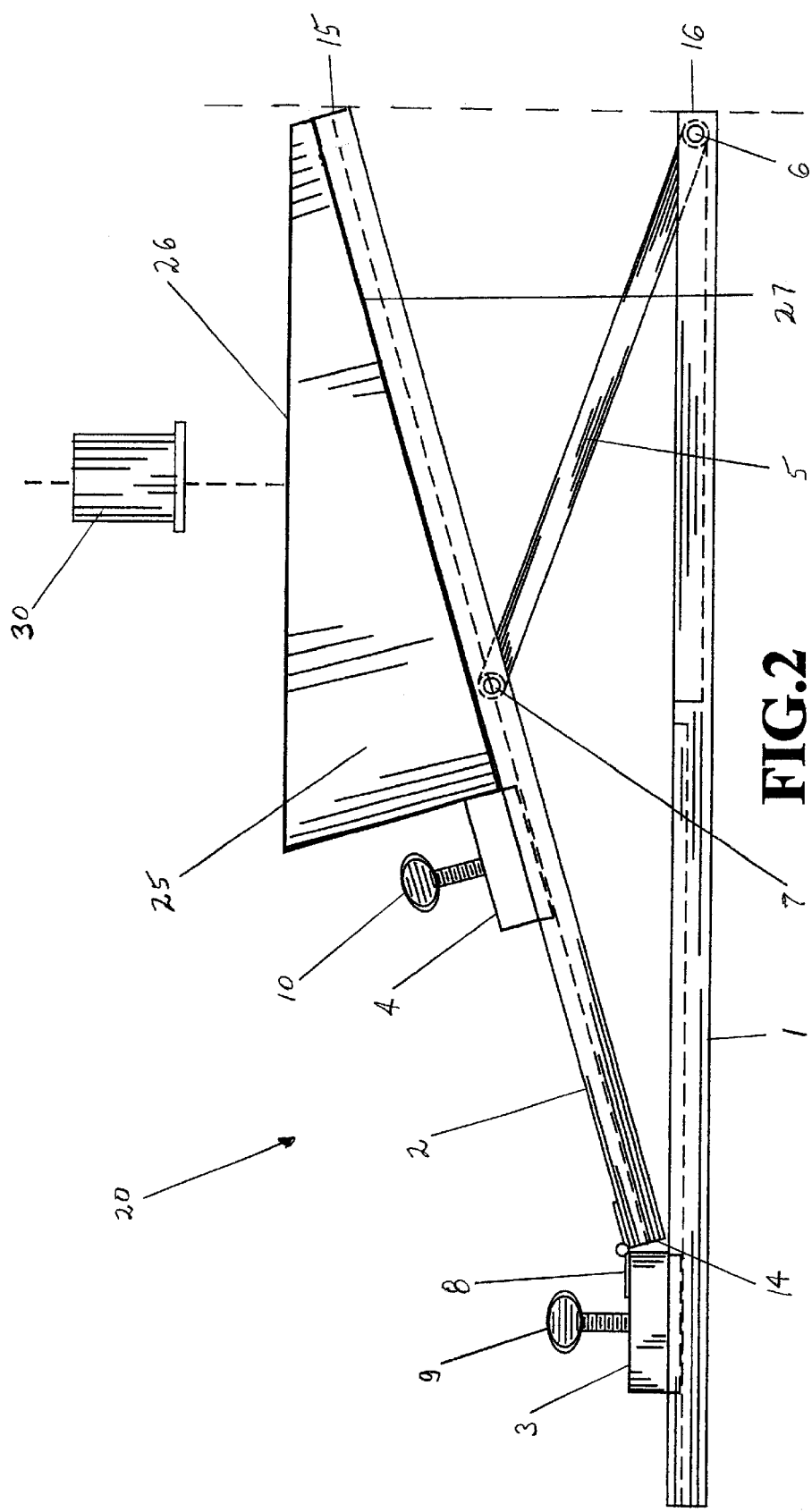
FIG. 2 illustrates a side elevation view of the holding fixture.

1. The material holding fixture (20) has a base or platform to which a holding platform is slidably engaged at a hinge end. A pair of lever arms are attached to the base and the holding platform such that when the holding platform is moved at the hinge end an end of the base and the holding platform are maintained in an imaginary plane perpendicular to the base 2. Referring to FIGS. 1 and 2, the holding device (20) has a base (1) with slide channels (11) and base pivot attachment positions (6). A groove (13) is also formed in the base (1) to allow retraction of levers (5) into the base (1).

3. An angle adjustment bar (3) having a slide projecting flange (12) is slidably engaged with the slide channels (11). In the preferred embodiment two base slide channels (11) are illustrated; however, other configurations may be used.

4. The adjustment bar (3) has the holding platform (2) attached in a rotating hinge manner by one or more hinges (8). Two lever arms (5) are pivotally attached at one base end (16) to the base pivot position (6) and at an opposite end to the holding platform pivot position (7). The base pivot position (6) is at the approximate end of the base (1) opposite the slide channels (11). The holding platform pivot position (7) is intermediate the holding platform hinge end (14) and the opposite end (15).

5. For proper positioning of a material object to be cut, the pivot positions (6, 7) are located such that sliding motion of the angle adjustment bar (3) and the resultant elevation of the end (15) maintain the end (15) and base end (16) in an imaginary plane generally perpendicular to the base (1).

6. The holding platform (2) has slide channels (11) to which a back guide (4) having slide protecting elements (12) is slidably engaged. The back guide (4) is used to retain the material object (25) in proper position when rotated to have a surface (26) cut or engraved.

7. Referring to FIGS. 1 through 4, in operation a material object (25) is positioned on the holding platform (2) by means of back guide (4). A thumbscrew (10) is illustrated for fixing the position of the back guide (4). The angle adjustment bar (3) is then moved toward the base end (16) thereby elevating the holding platform opposite end (15). When the surface (26) is relatively perpendicular to the optical axis (31) of the laser (30), the angle adjustment bar (3) is then fixed in position by a thumbscrew (9). The laser (30) lens is aligned to move in a plane that is parallel to the surface (26) to be engraved.

8. The positioning of the surface (26) to be cut perpendicular to the laser (30) facilitates the uniform cutting or engraving of the object (25). In the preferred embodiment the material object (25) at end (28) is aligned with opposite end (15) of the holding platform (2). This simplifies registration of the surface (26) to the laser (30) starting point. Obviously when surface (26) has other angular relationships to its opposite surface (27) the holding fixture (20) may be adjusted accordingly.

9. While the invention has been particularly shown and described with respect to the illustrated and preferred embodiments thereof, it will be understood by those skilled in the art that the foregoing and other changes in form and details may be made therein without departing from the spirit and scope of the invention.

I claim:

1. A device for holding material objects in position relative to a cutting device for cutting a surface thereof, comprising:

a base in slidable engagement with a rotatable holding platform at a hinge end;

a lever attached at one end to a base pivot position at approximately a base end and at a lever opposite end to the hinged holding platform at a holding platform pivot position intermediate the hinge end and an opposite end;

wherein the holding platform pivot position location maintains the opposite end and the base end in an imaginary plane perpendicular to the base as the opposite end is raised and lowered by sliding the hinged end; and a means for retaining an object in a fixed position.

2. The device as in claim 1 wherein the means for slidable engagement comprises the base having a slide channel defined therein and an angular adjustment bar having a slide projecting element for insertion in the slide channel.

3. The device as in claim 2 wherein the angular adjustment bar is attached to the holding platform by a hinge.

4. The device as in claim 1 wherein there is a back guide slidably engaged with the holding platform, which may be retained in a fixed position on the holding platform.

5. The device as in claim 1 wherein the base having a groove formed therein adjacent to the base pivot position.

* * * * *